United States Patent [19]
Kashyap et al.

[11] Patent Number: 5,384,884
[45] Date of Patent: Jan. 24, 1995

[54] METHOD OF FORMING OPTICAL FIBRE GRATINGS

[75] Inventors: Raman Kashyap; Robert J. Campbell, both of Suffolk, England

[73] Assignee: British Telecommunications public limited company, London, England

[21] Appl. No.: 50,194

[22] PCT Filed: Nov. 8, 1991

[86] PCT No.: PCT/GB91/01968
§ 371 Date: May 4, 1993
§ 102(e) Date: May 4, 1993

[87] PCT Pub. No.: WO92/08999
PCT Pub. Date: May 29, 1992

[30] Foreign Application Priority Data
Nov. 8, 1990 [GB] United Kingdom ............... 9024326

[51] Int. Cl.⁶ ............................................. G02B 6/10
[52] U.S. Cl. ...................................... 385/129; 385/37; 385/12; 359/566; 372/6
[58] Field of Search ........................ 385/129–132, 385/37, 12, 13, 10, 123; 359/566, 569; 250/227.18; 372/6

[56] References Cited

U.S. PATENT DOCUMENTS

| | | | |
|---|---|---|---|
| 3,675,157 | 7/1972 | Kaminow et al. | 372/6 |
| 3,891,302 | 6/1975 | Dabby et al. | 385/37 |
| 4,474,427 | 10/1984 | Hill et al. | 385/123 |
| 4,593,969 | 6/1986 | Goodman et al. | 385/37 |
| 4,636,031 | 1/1987 | Schmadel, Jr. et al. | 385/37 |
| 4,996,419 | 2/1991 | Morey | 250/227.18 |
| 5,016,967 | 5/1991 | Meltz et al. | 385/37 |
| 5,061,032 | 10/1991 | Meltz et al. | 385/37 |
| 5,208,877 | 5/1993 | Murphy et al. | 385/13 |

FOREIGN PATENT DOCUMENTS

0216212 1/1987 European Pat. Off. .
0286350 10/1988 European Pat. Off. .
2162836 12/1986 United Kingdom .
WO86/01303 2/1986 WIPO .

OTHER PUBLICATIONS

PCT Search Report, *European Patent Office*, completed 11 Feb. 1992.
*Electronic Letters*, vol. 22, No. 19, pp. 987–988, 11 Sep. 1986.
*Optics Letters*, vol. 3, No., pp. 66–68, Aug. 1978.
*Optics Letters*, Vol. 15, No. 2, pp. 102–104, Jan. 15, 1990.
Ragdale et al, *SPIE*, vol. 1171, "Fiber Laser Sources and Amplifiers" (1989) no month.
Yeh et al, Applied Optics, vol. 19, No. 16, pp. 2848–2855, 15 Aug. 1980.
LaRochelle et al, Optics Letters, vol. 15, No. 7, pp. 399–401, Apr 1, 1990.
Matsuhara et al, The Optical Soc. of Am., vol. 65, No. 7, pp. 804–809, (1975).
Matsuhara et al, Applied Optics, vol. 13, No. 12, pp. 2886–2888, Dec. 1974.
Hill, Applied Optics, vol. 13, No. 8, pp. 1853–1856, Aug. 1974.
Cross, Optics Letters, vol. 1, No. 1, pp. 43–45, Jul. 1977.
Stone, J. Appl. Phys. vol. 62, No. 11, pp. 4371–4374, 1 Dec. 1987.
Hill et al, Appl. Phys. Lett., vol. 32, No. 10, pp. 647–649, 15 May 1978.

*Primary Examiner*—Rodney B. Bovernick
*Assistant Examiner*—Phan Heartney
*Attorney, Agent, or Firm*—Nixon & Vanderhye

[57] ABSTRACT

An optical fibre is fixed between a clamp and a piezo-electric translation stage. An argon ion laser emitting at 514.5 nm is used to write Bragg gratings in the fibre. A different longitudinal stress is applied to the fibre before optically writing each Bragg grating. The fibre when unstressed will have a Bragg grating of different peak reflectivity corresponding to the number of different applied stresses.

3 Claims, 2 Drawing Sheets

METHOD OF FORMING OPTICAL FIBRE GRATINGS

BACKGROUND OF THE INVENTION

1. Field of the Invention

This invention relates to a method of forming two or more Bragg gratings in an optical fibre waveguide.

2. Related Art

In this specification the term "optical" is intended to refer to that part of the electromagnetic spectrum which is generally known as the visible region, together with those parts of the infra-red and ultraviolet (UV) regions at each end of the visible region which are capable of being transmitted by dielectric optical waveguides such as optical fibres.

There is considerable interest in exploiting photosensitivity in germanosilicate optical fibres for application in the areas of optical communications and sensors. The first reported permanent optically-induced changes of the refractive index of optical fibres was by K. O. Hill, Y. Fujii, D. C. Johnson and B. S. Kawasaki, "Photosensitivity in Optical Fibre Waveguides: Application to Reflection Filter Fabrication" Appl. Phys. Lett, 32, 647 (1978). In their experiment, coherent radiation at 514.5 nm, reflected from the fibre ends, generated a standing wave in the fibre which induced a periodic refractive index change along its length. This formed a high reflectivity Bragg grating in the fibre which peaked at the wavelength of the incident beam. Since then, numerous studies into the grating growth mechanism and photosensitive fibres have been carried out—see for example D. K. W. Lam, B. K. Garside, "Characterization of Single-Mode Optical Fibre Filters" Appl. Phys, Lett, 20, 440 (1981) and J. Stone, J. Appl. Phys., 62, 4371 (1987). However, the mechanism which results in the perturbation to the refractive index of the fibre core is not fully understood. The spectral region where the fiber is photosensitive has been found to range from the UV to around 700 nm.

The potential applications of fibre gratings are numerous. For example, in telecommunications applications, tunable integrated fibre gratings, externally written with a UV laser, may be used for spectral control of fibre lasers. B. S. Kawasaki, H. O. Hill, D. C. Johnson and Y. Fujii, in an article entitled "Narrow-band Bragg reflectors in optical fibres", Optics Letters Vol 3 No. 2 August 1978, pp 66–68, note that an important property of the grating formation process is the extent to which the filter response can be tailored. For example, one method of forming a complex filter is to superimpose two or more simple band-stop characteristics in the same fibre by illuminating the fibre with different wavelengths of light either simultaneously or consecutively.

Another known method of forming the Bragg gratings is by side-writing the gratings by interfering two coherent radiation beams at an appropriate angle. The pitch of the grating is determined by the angle of intersection of the two beams, so different grating pitches can be formed by adjusting this angle.

SUMMARY OF THE INVENTION

According to the present invention a method of forming two Bragg gratings in an optical fibre is characterized in that a different longitudinal stress is applied to the fibre before optically writing each grating, all the gratings having the same Bragg condition at the time of writing.

The present invention provides a method of writing two or more Bragg gratings without the need for multiple wavelength illumination.

The method of the present invention exploits the fact that optical fiber can, theoretically, be linearly strained by up to 20%. If a photorefractive fibre, length 1, is illuminated by a light from a laser of wavelength $\lambda_0$, this will result in a grating of period of about $\lambda_0/2n_{\mathit{eff}}$, where $n_{\mathit{eff}}$ is the fiber mode refractive index. If the fibre is now stretched by $\Delta l$, then, when illuminated, a grating of the same pitch, i.e. the same Bragg condition, as before will be written. When the fibre is allowed to relax to its unstressed, normal length after writing, the pitch of this second grating will be slightly smaller than the first grating. For the case of a reflection filter, the second grating has a peak wavelength which is smaller than the writing wavelength. This can be extended to providing several different pitch gratings in the same fibre.

If, for example, there are two gratings of different period in the fibre; then, if it is assumed that they have some relative phase relationship, the index modulation in the fibre is effectively given by the superposition of the two index modulations. This is given by $$n_{\mathit{eff}}(z) = A_1 \cos((k_1+k_2)Z) \cos((k_1-k_2)Z)$$

where $k_1$ and $k_2$ are the wave numbers of the two gratings, Z is the propagation direction, and $A_1$ is the amplitude of the refractive index perturbation. At present, it is the second modulation term that is of interest and it can be assumed that the first term, which is a high frequency term, is a constant. (This high frequency term can in principle be used as a short wavelength reflection filter). The index modulation is therefore now given by $$n_{\mathit{eff}}(Z) = A_2 \cos((k_1-k_2)Z)$$

From this expression, it can be seen that, by choosing the periods of the two optically-written gratings, a resultant grating of any period can be generated. The frequency difference grating written in the fibre is of particular interest in applications such as SHG, polarization conversion and mode conversion, as it allows the necessary phase matching conditions to be met for these processes. The actual operating wavelength depends only on the difference in the values of $k_1$ and $k_2$, and not on the actual write wavelength itself. For example, a simple calculation shows that the fibre would have to be stretched by approximately 2% if it is to be used for phase matching in SHG. Even smaller changes in fibre length would be required for polarization and mode convertors. These fibre length changes should be easily attainable in the fibre currently being used in experiments.

It may also be possible to write reflection gratings for use at the telecommunications bandwidth of 1.3–1.5 $\mu$m if the fibre can be stretched by approximately 10%. This is still within the theoretically predicted change; but, due to defects in the manufacture of the fibre, it is not clear whether it is possible to do this. Assuming that it may be done, this would allow high reflectivity, small bandwidth gratings to be written in the fibre. It would also be possible to write several gratings in the fibre, which would allow pulse generation and shaping of incident laser light.

A convenient method of applying the different longitudinal stresses to the fibre to produce the different strains, is to clamp one end of the fibre, and to apply the stress by means of a piezo-electric translation stage clamped to the other end of the fibre. Clearly, other stressing means may be used such as a clamped micrometer attached to the fibre end instead of the piezo-electric translation stage.

Other writing techniques can be used, for example wrapping the fibre around a cylinder, the stress being applied to the fibre by varying the radius of the cylinder by a piezo-electric expander. Also the fibre could be coated with a piezo-electric cladding, and the strain could be changed by varying the applied voltage.

The invention is applicable to external grating writing methods, as well as to gratings written by launching an optical signal down the fibre.

BRIEF DESCRIPTION OF THE DRAWINGS

An embodiment of the present invention will now be described, by way of example, with reference to the accompanying drawings, of which.

DETAILED DESCRIPTION OF EXEMPLARY EMBODIMENTS

Figure 1:
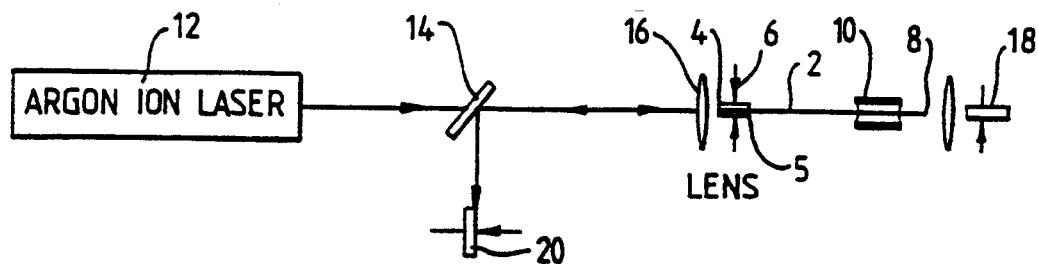
FIG. 1 is a schematic diagram of apparatus specifically designed for carrying out the method of the present invention.

The experimental apparatus used to write gratings in single mode germanosilicate fibres at 514.5 nm is shown in FIG. 1. A fibre 2 with a radius of 0.9 $\mu$m and a $\Delta$n of 0.012 has one end 4 enclosed in a glass ferrule 5 and clamped with a clamp 6. The other end 8 of the fiber 2 is connected to a piezo-electric translation stage 10, which allows the length of the fibre, about equal to 50 cm in this case, to be changed by up to by 20 $\mu$m. The gratings are written by coupling an argon ion laser 12 lasing at 514.5 nm into the end 4 of the fibre 2 via a partial reflector 14 and a lens 16. The signal exiting the end 8 of the fibre 2 during writing of a grating is focussed onto a photodetector 18. The increasing signal reflected by the grating as it is written into the fibre 2 exits the end 4 of the fibre 2, and is focussed by the lens 16 and reflected to a photodetector 20 by the partial reflector 14.

During the writing and reading of the grating, the polarization of the input and monitor beams are carefully controlled.

The reflectance profile of the fibre 2 after writing the gratings is obtained by launching 0.5 mW of 514.5 nm light into the fibre, and then stretching the fibre using the piezo-electric translation stage 10.

Figure 2:
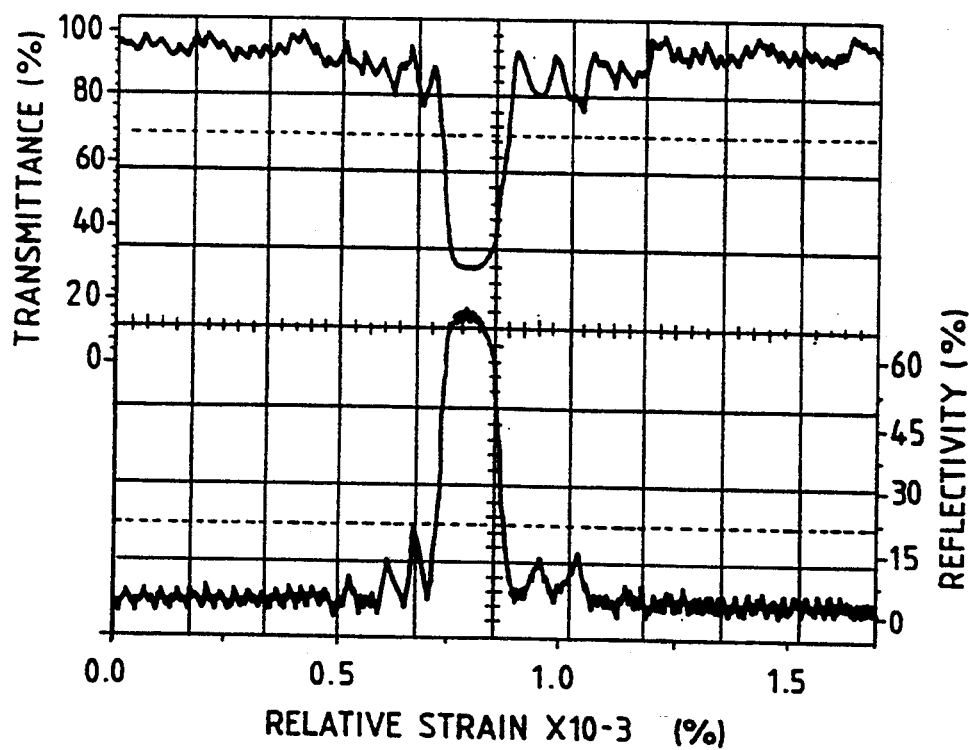
FIG. 2 is a graph of the reflectance and transmittance of a fibre grating as a function of relative strain.

FIG. 2 shows the low power reflectance/transmittance of a typical grating formed in the fibre after 250 mW, from the single mode argon ion laser 12, is launched into it for approximately two minutes. This gives the reflectance/transmittance profile of the grating as the Bragg condition of the grating linearly changes with strain. From this data, the grating was found to have a peak relativity of 70% and a bandwidth of 482 MHz. The profile of the grating shown in FIG. 2 is similar to the sinc$^2$ reflection profile normally associated with Bragg reflectors.

By changing the strain applied to the fibre 2 before writing a grating, a further three gratings can be optically written in the same fibre, each with a peak wavelength separated by 46 GHz. By varying the strain applied to the fibre, the four gratings written in the fibre can be scanned through.

Figure 3:
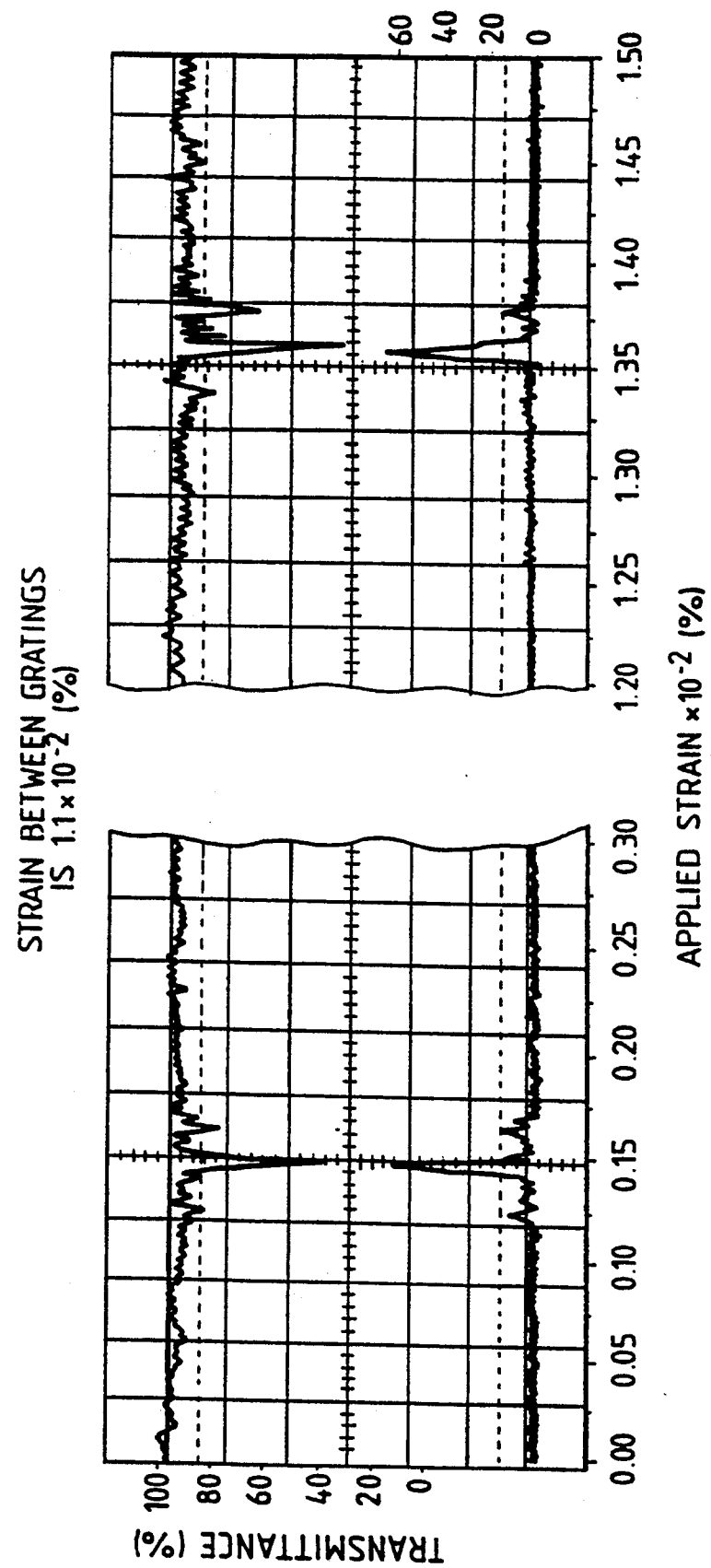
FIG. 3 is a graph of the reflectance and transmittance of a fibre having two gratings as a function of applied strain.

FIG. 3 shows the transmittance and reflectance, as a function of applied strain, for a probe signal of 514.5 nm from the argon laser 12 for a strain range which scans through two of the four gratings.

We claim:

1. A method of forming first and second Bragg gratings in an optical fiber waveguide, comprising the steps of:

subjecting an optical fiber waveguide to a first longitudinal stress;

directing optical radiation into the fiber so as to form a spatially periodic intensity pattern therein, whereby to induce a corresponding spatially periodic perturbation of the refractive index of the waveguide, thus writing a first grating with a predetermined Bragg condition into the waveguide while under said first longitudinal stress, thereafter subjecting the optical fiber waveguide to a second different longitudinal stress;

directing optical radiation into the fiber so as to form said spatially periodic intensity pattern therein and induce said corresponding spatially periodic perturbation of the refractive index of the waveguide, thus writing a second grating with said predetermined Bragg condition into the waveguide while under said second longitudinal stress; and thereafter releasing the stress so that said first and second gratings exhibit different Bragg conditions.

2. A method as claimed in claim 6 including directing said optical radiation into one end of the fiber waveguide such that a standing wave is established therein whereby to form said spatially periodic intensity pattern.

3. A method as claimed in claim 6 including monitoring the radiation reflected back out of said end of the fiber whereby to monitor the formation of the first and second gratings.

* * * * *